(12) United States Patent
De Geronimo et al.

(10) Patent No.: US 7,531,808 B1
(45) Date of Patent: May 12, 2009

(54) METHOD FOR THE DEPTH CORRECTED DETECTION OF IONIZING EVENTS FROM A CO-PLANAR GRIDS SENSOR

(75) Inventors: Gianluigi De Geronimo, Syosset, NY (US); Aleksey E. Bolotnikov, South Setauket, NY (US); Gabriella Carini, Port Jefferson, NY (US)

(73) Assignee: The United States of America as represented by the U.S. Department of Energy, Washington, DC (US)

( * ) Notice: Subject to any disclaimer, the term of this patent is extended or adjusted under 35 U.S.C. 154(b) by 260 days.

(21) Appl. No.: 11/626,919

(22) Filed: Jan. 25, 2007

Related U.S. Application Data

(60) Provisional application No. 60/820,533, filed on Jul. 27, 2006.

(51) Int. Cl.
*H01L 27/00* (2006.01)
*H01L 27/146* (2006.01)
(52) U.S. Cl. .............................. 250/370.1; 250/370.01; 250/370.13
(58) Field of Classification Search .................. 250/367, 250/370.1, 370.13, 370.09, 370.06, 382
See application file for complete search history.

(56) References Cited

U.S. PATENT DOCUMENTS 6,218,668 B1 * 4/2001 Luke ...................... 250/370.01

OTHER PUBLICATIONS

De Geronimo, Gianluigi, Aleksey E. Bolotnikov, Gabriella Carini, Jack Fried, Paul O'Connor, and Stephen A. Soldner. "ASIC for CPG Sensors with Grid-Only Depth-of-Interaction Sensing." 2005 IEEE Nuclear Science Symposium Conference Record: 945-9.*
Carini, G. A., A. E. Bolotnikov, G. S. Camarda, G. De Geronimo, D. P. Siddons, G. W. Wright, and R. B. James. "New Results from Testing of Coplanar-Grid CdZnTe Detectors." Proc. of SPIE 59220: M1-6.*
Bolotnikov A. E., G. S. Camarda, G. A. Carini, M. Fiederle, L. Li, G. W. Wright, and R. B. James. "Performance Studies of CdZnTe Detector by Using a Pulse Shape Analysis." Proc. of SPIE 5922: K1-12.*

* cited by examiner

*Primary Examiner*—David P Porta
*Assistant Examiner*—Casey Bryant
(74) *Attorney, Agent, or Firm*—Michael J. Dobbs; Bradley W. Smith; Paul A. Gottlieb

(57) ABSTRACT

A method for the detection of ionizing events utilizing a co-planar grids sensor comprising a semiconductor substrate, cathode electrode, collecting grid and non-collecting grid. The semiconductor substrate is sensitive to ionizing radiation. A voltage less than 0 Volts is applied to the cathode electrode. A voltage greater than the voltage applied to the cathode is applied to the non-collecting grid. A voltage greater than the voltage applied to the non-collecting grid is applied to the collecting grid. The collecting grid and the non-collecting grid are summed and subtracted creating a sum and difference respectively. The difference and sum are divided creating a ratio. A gain coefficient factor for each depth (distance between the ionizing event and the collecting grid) is determined, whereby the difference between the collecting electrode and the non-collecting electrode multiplied by the corresponding gain coefficient is the depth corrected energy of an ionizing event. Therefore, the energy of each ionizing event is the difference between the collecting grid and the non-collecting grid multiplied by the corresponding gain coefficient. The depth of the ionizing event can also be determined from the ratio.

20 Claims, 4 Drawing Sheets

Prior Art

METHOD FOR THE DEPTH CORRECTED DETECTION OF IONIZING EVENTS FROM A CO-PLANAR GRIDS SENSOR

RELATED APPLICATIONS

This U.S. non-provisional application is related to and claims priority of U.S. provisional application 60/820,533 filed Jul. 27, 2006, which is hereby fully incorporated by reference in its entirety.

GOVERNMENT INTERESTS

The United States Government has rights in this invention pursuant to Contract No. DE-AC02-98CH10886, between the U.S. Department of Energy (DOE) and the Brookhaven Science Associates LLC.

FIELD OF THE INVENTION

The present invention relates to the detection of ionizing events. More particularly, the present invention relates to the detection of the depth corrected (accounting for electron trapping within a semiconductor substrate) energy of ionizing events using a co-planar grids sensor. Preferably, the present invention is for the detection of depth corrected energy of gamma-rays using a co-planar grids sensor.

BACKGROUND OF THE INVENTION

The high-resolution detection of gamma-rays is useful in applications such as the detection of nuclear material or material that has been exposed to high energy radiation. Emissions from radioactive materials such as uranium or plutonium provide unique signatures that, if accurately measured, can indicate the age and enrichment of the material and sometimes its intended purpose or origin. Currently, the most promising methods of detecting gamma-rays use semiconductors having high atomic numbers and wide band-gaps such as $HgI_2$, CdTe and CdZnTe.

Semiconductors having high atomic numbers generally have high detection efficiency, do not require cryogenic cooling, and have the potential for very high resolution. Currently, the preferred use of these semiconductors is in a co-planar grids (CPG) configuration. P. N. Luke, "Electrode configuration and energy resolution in gamma-ray detectors" Nuclear Instruments and Methods in Physics Research A 380 (1996) 232-237, herein fully incorporated by reference, describes the co-planar grids (CPG) configuration. This concept is illustrated in the CPG 1 shown in FIG. 1.

The typical CPG, shown in FIG. 1, generally comprises a semiconductor substrate 3 having a cathode electrode 5 on a first side and an adjacent second side having a collecting grid 7 and a non-collecting grid 9. The collecting grid 7 and the non-collecting grid 9 are coplanar and interdigitally positioned covering the second side of the substrate 3. The collecting grid 7 and non-collecting grid 9 are interdigitally positioned whereby the collecting grid 7 and the non-collecting grid 9 both at least partially cover the second side of the substrate 3 in an alternating fashion. For example, the collecting grid 7 and non-collecting grid 9 commonly cover the second side of the substrate 3 using a pattern whereby the collecting grid 7 covers about 500 microns followed by the non-collecting grid 9 covering the next 500 microns. A small bias voltage is applied across the collecting grid 7 and the non-collecting grid 9 so that electrons in proximity of the grids are collected by the collecting grid 7. A highly negative voltage is applied to the cathode electrode 5, thus generating an electric field in the substrate 3 moving electrons towards the collecting grid 7 and non-collecting grid 9.

Ionizing radiation generates charges (electrons and holes) within the substrate 3. The electrons move in the substrate 3 towards the collecting grid 7 and non-collecting grid 9, inducing an identical voltage on the collecting grid 7 and the non-collecting grid 9. The same occurs for the much slower holes, moving towards the cathode 5. Electrons approaching the grids are collected by the collecting grid 7, inducing a measurable voltage on the collecting grid 7. Therefore, a voltage difference between the collecting grid 7 and the non-collecting grid 9 occurs only when the electrons are collected by the collecting grid 7. Since, electrons within the substrate 3 induce an equal voltage to both the collecting grid 7 and non-collecting grid 9 they have no affect on the voltage difference between the collecting grid 7 and the non-collecting grid 9. Therefore, ionizing events may be detected using the voltage difference between the collecting grid 7 and the non-collecting grid 9.

The collecting grid 7, shown in FIG. 1, is typically connected by a wire 101 to a collecting grid amplifier 11, which produces a low voltage signal representative of the voltage induced on the collecting grid 7 by ionizing events. Likewise, the non-collecting grid 9 is typically connected by a wire 103 to a non-collecting grid amplifier 13, which produces a low voltage signal representative of the voltage induced on the non-collecting grid 9 by ionizing events. Both the collecting grid amplifier 11 and the non-collecting grid amplifier 13 are each connected by wires (105 and 107) to a difference amplifier 15, which is capable of determining the difference of the collecting grid amplifier 11 and the non-collecting grid amplifier 13 signals. Essentially the output of the difference amplifier 15 is the difference in the voltages of the collecting grid 7 and the non-collecting grid 9. This difference is due to the collection at the collecting grid 7 of electrons freed by ionizing radiation.

By making the detector insensitive to the electrons and holes traveling in the substrate 3 the resolving capability of the system is greatly enhanced. On the other hand, the system is still limited by the trapping effect, energy loss due to electron trapping in the substrate 3. The longer the electrons travel in the substrate 3 the more energy they lose. Consequently, the charge associated with an ionizing event still shows a residual dependence on the depth of the ionizing event that can substantially limit the resolution of the detector.

In order to compensate for the trapping effect three techniques have been proposed (a) lowering the gain of the non-collecting grid 9 relative to that of the collecting grid 7, (b) weighting each event by measuring its depth of ionizing event through measurement of the amplitude of the cathode 5 voltage, (c) using timing information from the collecting grid 7 and non-collecting grid 9 to calculate depth information and weighing each event by its calculated depth.

The relative gain compensation technique was proposed by Paul Luke in 1996 and is shown in FIG. 2. The relative gain CPG 17 is essentially the CPG 1 of FIG. 1 further comprising a gain amplifier 19 positioned between and connected by wires (109 and 111) to the non-collecting grid amplifier 13 and the difference amplifier 15. The gain amplifier 19 reduces the gain of the non-collecting grid amplifier 13 voltage relative to the gain of the collecting grid amplifier 11 voltage. With this approach a small amount of induction from electrons traveling in the substrate 3 is reintroduced into the system. The amptitude of the deep-ionizing events (ionizing events close to cathode) is increased, while the non-deep-ionizing events (ionizing events close to grids) is reduced, resulting in a first order compensation of the trapping effects. The optimum value of the relative gain typically ranges between about 0.6 and 0.9, depending on the quality of the sensor, the voltage difference between the collecting grid 7 and the non-collecting grid 9, and the temperature of the sensor. Generally, instead of a gain amplifier 19, shown for clarity, the gain is typically adjusted by modifying the value of a passive element in the difference amplifier 15, typically a resistor.

Unfortunately, the correction by the relative gain compensation technique is roughly linear and provides only a first order compensation for the trapping effects, resulting in over compensation for some ionizing events, and under compensation for others. Therefore, this technique has a limited resolution. Furthermore, if the relative gain needs to be modified (due to replacement of the sensor or a change in voltage and/or temperature), a hardware change is needed, which is impractical especially in commercial applications.

The cathode technique was proposed in Z. He, G. F. Knoll, D. K. Wehe, R. Rojeski, C. H. Mastrangelo, M. Hamming, C. Berret, and A. Uritani, "1-d position-sensitive single carrier semiconductor detectors", Nuclear Instruments and Methods in Physics Research A 380 (1996), 228-231, hereby fully incorporated by reference. FIG. 3 shows a typical CPG using the cathode technique 25, essentially the CPG 1 of FIG. 1 further comprising a cathode amplifier 27. The cathode amplifier 27 is connected by a wire 113 to the cathode electrode 5. By calculating the ratio between the voltage of the cathode amplifier 27 and the voltage of the difference amplifier 15, it is possible to extract the depth of an ionizing event. The difference amplifier 15 voltage of an ionizing event can be corrected (weighted) for the trapping effect according to the value of an associated depth of the ionizing event, gathered by calibrating the sensor. The optimum weighting parameters depends on factors such as the quality of the sensor, the voltage difference between the collecting grid 7 and the non-collecting grid 9, and the temperature of the CPG 25.

The cathode technique allows a higher order compensation of the trapping effects, thus potentially achieving a better resolution when compared to the relative gain technique. However, more complex electronics are needed for the additional cathode amplifier 27. These electronics are more complicated than the collecting amplifier 7 and the non-collecting amplifier 9 since the cathode amplifier 27 must operate at extreme negative voltages in the order of thousands of Volts, compared to the typical 0-60 Volts operating voltage of the collecting amplifier 7 and non-collecting amplifier 9. For example, the cathode amplifier 27 typically requires a bulky high voltage capacitor to couple the high voltage cathode to a charge amplifier.

Another more recent method developed is the timing of grids technique proposed by G. De Geronimo et al. in U.S. patent application Ser. No. 11/174,241. This technique uses the CPG of FIG. 1 and consists of measuring the depth of ionizing event by using the timing information from the collecting grid amplifier 11 and the difference amplifier 15. The difference signal of the event is corrected (weighted) for the trapping effect according to the value of an associated depth of ionizing event.

The timing difference between two signals is a measure of the depth of ionizing event. The first timing signal occurs in correspondence of the ionizing event, detected by the collecting grid amplifier 11. The second timing signal occurs when the charge approaches the collecting grid 7, detected by the difference amplifier 15. In case of the deepinteracting events (ionizing events close to cathode) the associated timing difference is large, while in the case of the non-deep-interacting events (ionizing events close to grids) the timing difference is small.

Unfortunately, the timing of grids technique requires complex timing signals and related logic circuitry. The timing signals and logic also complicates noise considerations of the sensor design from the interaction between the digital logic circuitry and the analog components utilized in this method.

Therefore, there is a need for a method of accurately detecting ionizing events in real time.

SUMMARY OF THE INVENTION

One embodiment of the present invention is a method of measuring the depth corrected energy of an ionizing event from a co-planar grids sensor (CPG). In addition to subtracting the collecting grid and the non-collecting grid, the collecting grid and non-collecting grid are also summed. A ratio of the sum and difference is used to determine the depth corrected energy of the ionizing event.

In another embodiment of the present invention the precise depth of an ionizing event is determined using a CPG sensor by using the summation and difference of the collecting grid and non-collecting grid.

It is an object of an embodiment of the present invention to accurately detect ionizing events with a CPG sensor accounting for the trapping of electrons within the CGP substrate white not requiring additional bulky or complex components.

It is yet another object of the present inventions to accurately detect ionizing events with a CPG sensor accounting for the trapping of electrons within the CGP substrate while not requiring the use and determination of complex timing signals.

Even stilt, it is another object of the present invention, to accurately detect ionizing events with a CPG sensor accounting for the trapping of electrons within the CGP substrate white not requiring complex components to determine the voltage of the cathode of the CPG.

It is yet another object of the present invention to accurately detect ionizing events with a CPG sensor accounting for the trapping of electrons within the CGP substrate, while utilizing only a semiconductor substrate, two amplifiers, two analogtodigital converts and a computing device.

It is still yet another object of the present invention, to accurately detect the depth of ionizing events on a CPG sensor.

DETAILED DESCRIPTION OF THE INVENTION

Figure 1:
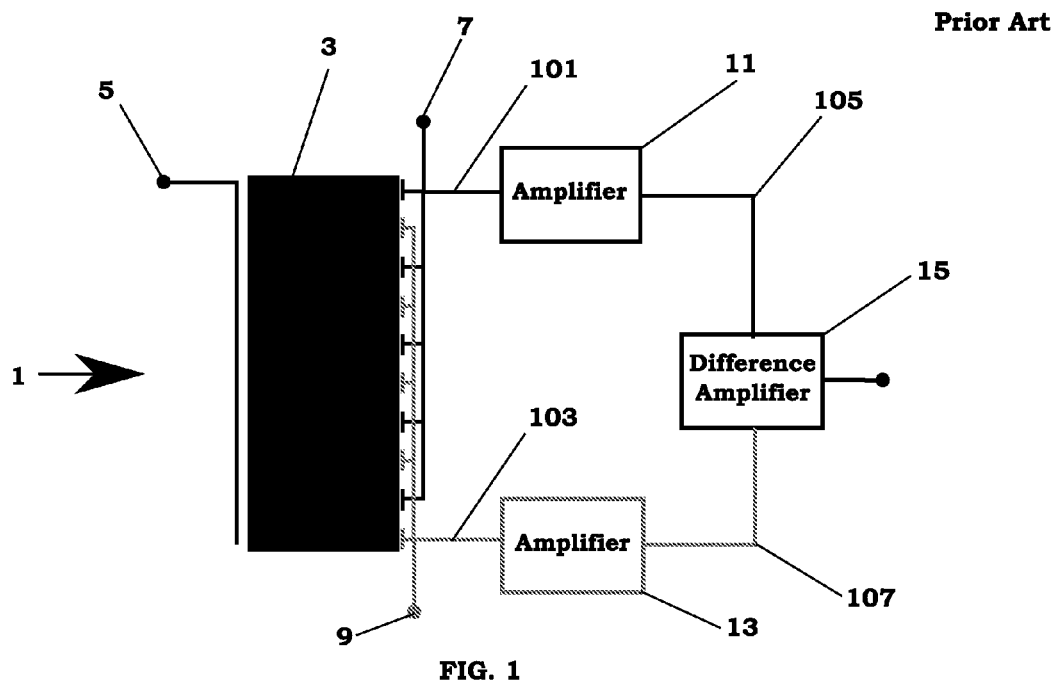
FIG. 1 depicts a typical co-planar grids sensor.
Figure 2:
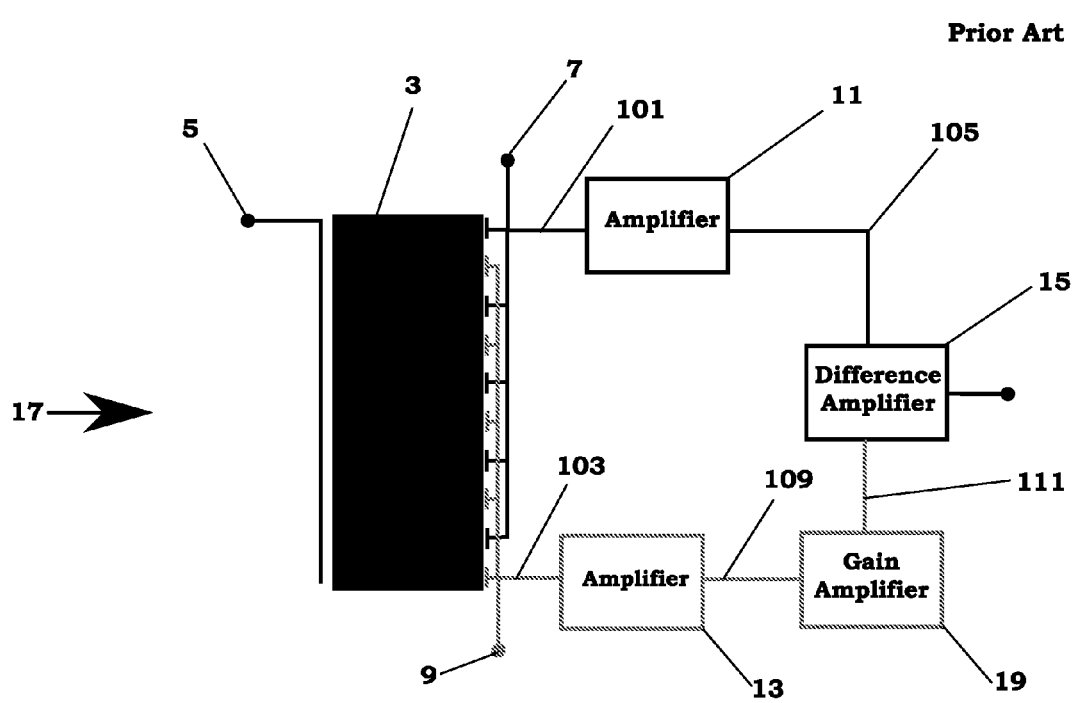
FIG. 2 depicts a typical co-ptanar grids sensor utilizing the relative gain compensation technique.
Figure 3:
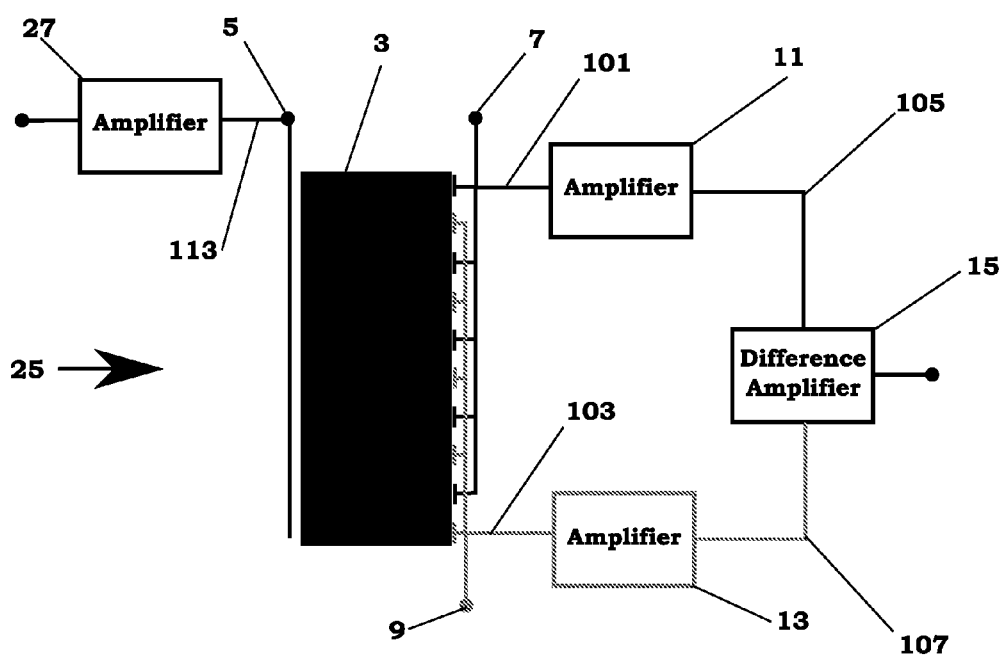
FIG. 3 depicts a typical co-planar grids sensor utilizing the cathode technique.

The present invention relates to the detection of ionizing events using a co-planar grids (CPG) sensor. Preferably, the present invention is for gamma-ray detection using a CPG sensor. The present invention accounts for trapped electrons within a CPG sensor creating a depth corrected energy (accounting for electron energy loss in the sensor between the ionizing event and the collecting grid). The present invention also relates to the depth detection of an ionizing event. The preferred embodiment, shown in FIG. 4, comprises a substrate 3 having a cathode electrode 5, a collecting grid 7 and a non-collecting grid 9.

In the preferred embodiment, a large negative voltage, preferably between about negative 1,500 and negative 7,000 Volts, relative to earth-ground, is applied to the cathode electrode 5. A voltage greater than the voltage applied to the cathode electrode 5 is applied to the collecting grid 7 and non-collecting grid 9. There is a small bias between the voltage supplied to the collecting grid 7 and non-collecting grid 9, preferably about 60 Volts. Therefore, the collecting grid 7 is at a higher voltage than the non-collecting grid 9 and the cathode electrode 5. Preferably, the collecting grid 7 is at about 0 Volts (earth ground), and the non-collecting grid 9 is at about negative 60 Volts.

When charges (electrons and holes) are generated by the ionizing radiation, the electrons move in the substrate 3 towards the grids (collecting grid 7 and non-collecting grid 9), inducing an identical signal on the two grids. The same occurs for the much slower holes, moving towards the cathode electrode 5. Once the electrons approach the grids, they are collected by the collecting grid 7, and a difference between the voltages of the collecting grid 7 and the non collecting grid 9 is a directly related to the energy of the ionizing radiation. Since electrons moving through the substrate 3 produce an identical signal upon the collecting grid 7 and the non-collecting grid 9, electrons present in the substrate do not affect the difference of the voltages of the collecting electrode 7 and the non-collecting electrode 9, but affect the sum of the voltages of the collecting electrode 7 and the non-collecting electrode 9.

The ratio between the sum and the difference of the voltages of the collecting electrode 7 and the non-collecting electrode 9 are to a first order a measure of the depth (distance between the ionizing event and the collecting grid 7) of the ionizing event. The sum is to a first order dependent on the depth of ionizing event. The difference is to a first order independent of the depth of ionizing event. In case of the deep-interacting events (ionizing events closer to cathode electrode 5), the ratio between the sum and the difference is closer to one, while in the case of the non-deep interacting events (ionizing events closer to grids) the ratio is closer to zero.

Therefore, a gain coefficient can be calculated by taking measurements of a known ionizing event and calculating a value of the gain coefficient whereby the difference between the voltages of the collecting grid 7 and the non collecting grid 9 when multiplied by the gain coefficient will equal the energy of the ionizing event. Preferably, after a known ionizing event, a gain coefficient is determined for each depth by dividing the known energy of the ionizing event with the difference between the voltages of the collecting grid 7 and the non collecting grid 9. Therefore, the difference between the voltages of the collecting grid 7 and the non collecting grid 9 detected at a depth multiplied by the gain coefficient for that depth will be the depth corrected energy of the ionizing event. The gain coefficient may be generated by non-linear methods, or simple linear approximation. The actual calculations may be performed by a user, or preferably automatically generated by a computer device. For example a microcontroller may calculate a gain coefficient for each depth of ionizing event.

The gain coefficient may be calculated before every use, but preferably is only periodically done as a calibration. Preferably, the gain coefficient is recalculated when events occur that significantly after the depth interaction of the ionizing events, such as significant changes in the temperature of the sensor.

In one embodiment, Cs-137 is used to generate gamma emissions at 662 keV (kilo electron Volts). Measurements are taken by the sensor. A table of gains coefficient is generated by dividing the known emission frequency of 662 KeV with the peak reading from the difference between the voltages of the collecting grid 7 and the non collecting grid 9 at each depth.

Figure 4:
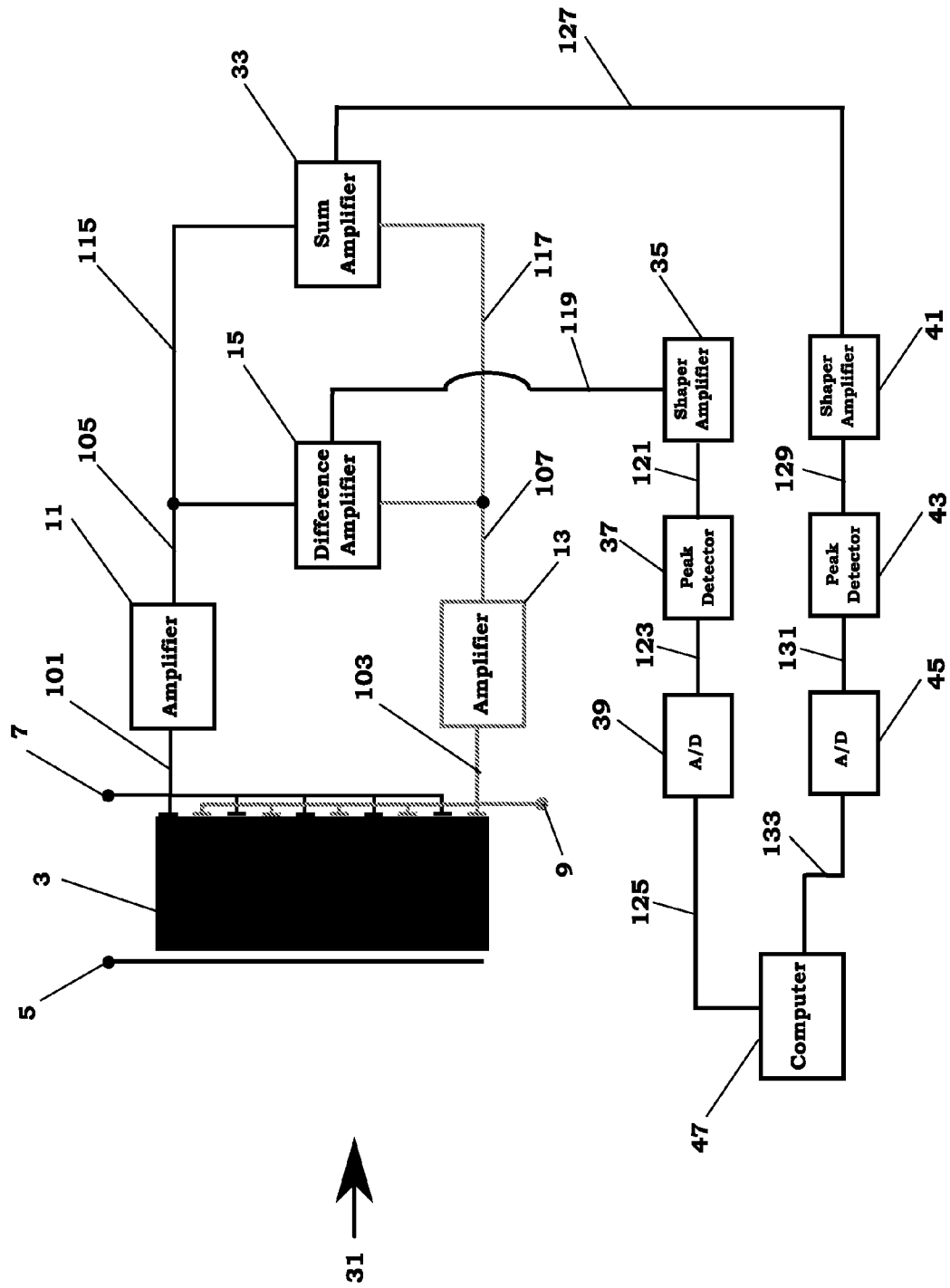
FIG. 4 depicts the preferred embodiment of a co-planar grids sensor.

In the preferred embodiment 31 shown in FIG. 4, the collecting electrode 7 is connected by a wire 101 to a collecting amplifier 11. The collecting amplifier 11 amplifies changes in voltage induced by ionizing events of the collecting electrode 7, and outputs to a difference amplifier 15 via a wire 105, and a sum amplifier 33 via another wire 115.

Likewise, the non-collecting grid 9 is connected by a wire 103 to a non-collecting amplifier 13. The non-collecting amplifier 13 amplifies changes in voltage induced by ionizing events of the non-collecting electrode 9, and outputs to the difference amplifier 15 via a wire 107, and the sum amplifier 33 via another wire 117.

Before being read by a computer 47, the outputs of the difference amplifier 15 and the sum amplifier 33 each preferably undergoes signal processing to prevent noise from affecting the system. In the preferred embodiment, analog-to-digital converters (39 and 45), peak detectors (37 and 43), and shaper amplifiers (35 and 41) are used to prevent noise from affecting the system and to convert analog to digital for further processing.

Therefore, the difference amplifier 15 output is connected to a first shaper amplifier 35 by a wire 119. The first shaper amplifier 35 is connected by a wire 121 to a first peak detector 37. The first peak detector 37 is connected by a wire 123 to a first analog-to-digital (A/D) converter 39. The first A/D converter 39 is connected by a wire 125 to a computer 47. In the alternative, the various connections between the difference amplifier 15 and the computer 47 may be analog or digital, and use one or more wires, buses, or a wireless transfer systems such as infra-red, radio frequency, sound frequency, etc.

In the alternative, the voltage of the collecting grid 7 and the non-collecting grid 9 are converted into digital values using an analog-to-digital converter, and then digitally subtracted.

In another alternative, the shaper amplifiers (35 and 41) are placed after the collecting amplifier 11 and the non-collecting amplifier 13, instead of the difference amplifier 15 and sum amplifier 33 respectively.

Likewise, the sum amplifier 33 output is connected to a second shaper amplifier 41 by a wire 127. The second shaper amplifier 41 is connected by a wire 129 to a second peak detector 43. The second peak detector 43 is connected by a wire 131 to a second analog-to-digital (A/D) converter 45. The second A/D converter 45 is connected by a wire 133 to the computer 47. In the alternative, the various connections between the sum amplifier 33 and the computer 47 may be analog or digital, and use one or more wires, buses, or a wireless transfer systems such as infra-red, radio frequency, sound frequency, etc.

In the alternative, the voltage of the collecting grid 7 and the non-collecting grid 9 are converted into digital values using an analog-to-digital converter, and then digitally summed.

In one embodiment, the collecting grid 7, the non-collecting grid 9, or a combination thereof are connected to a computer, ASIC, or microcontroller. Preferably, the computer, ASIC, or microcontroller has a built in A/D converter, however an external A/D converter may also be used. In this embodiment, the computer, ASIC, or microcontroller digitally filters the signals from the collecting grid 7 and the non-collecting grid 9, and digitally subtracts and adds the signals creating a difference value and a sum value respectively. The computer, ASIC, or microcontroller also divides the sum and difference values creating a ratio value. This ratio value is then used by the computer, ASIC, or microcontroller in an equation or a table of depths and ratios to determine the depth of an ionizing event. Once the depth of the ionizing event is determined, the energy of the ionizing event is adjusted to compensate for electron trapping within the substrate 3. In the alternative, the depth of the ionizing event is not determined, and the ratio is directly used to determine a gain coefficient which, when multiplied with the difference value is the depth corrected energy of the ionizing event.

The substrate 3 is made out of any material sensitive to ionizing radiation whereby carriers, created by ionizing radiation, are subject to trapping, poor mobility and a short lifetime. In a preferred embodiment, the substrate 3 is a CdZnTe or $HgI_2$ substrate, which is sensitive to high energy X-rays, or gamma-rays. In an alternate embodiment, a silicon based substrate is used, which is sensitive to X-rays.

The cathode electrode 5, collecting grid 7, non-collecting grid 9, and wires (101, 103, 105, 107, 115, 117, 121, 123, 125, 127, 129, 131, and 133) are each made of an electrically conducting material, preferably, Al.

The collecting amplifier 11 and the non-collecting amplifier 13 are each a charge amplifier capable of amplifying the voltage change of the collecting grid 7 and the non-collecting grid 9 respectively. Preferably, the collecting amplifier 11 and the non-collecting amplifier 13 are constructed using operational amplifiers with a feedback capacitor.

The difference amplifier 15 is a device able to subtract the voltage of the collecting grid 7 and the non-collecting grid 9. Preferably, the difference amplifier 15 is a differential operational amplifier having a unity gain (1:1).

The difference amplifier 15 is in communication with the collecting amplifier 11 and the non-collecting amplifier 13 outputs preferably by: the analog or digital use of one or more wires, buses, or by wireless transfer such as infra-red, radio frequency, sound frequency, etc.

The sum amplifier 33 is any device capable of summing the output from the collecting amplifier 11 and the non-collecting amplifier 13. Preferably, the sum amplifier 33 is a summing operation amplifier. In a preferred embodiment, the sum amplifier 33 is an Ortec 433A sum amplifier.

The sum amplifier 33 is in communication with the collecting amplifier 11 and the non-collecting amplifier 13 outputs preferably by: the analog or digital use of one or more wires, buses, or by wireless transfer such as infra-red, radio frequency, sound frequency, etc.

Each shaper amplifier (first shaper amplifier 35 and second shaper amplifier 41) filters out signal noise preferably by the use of a low pass, or band-pass filter. Preferably, each shaper amplifier is an about 1 Mhz low pass operational amplifier based filter. In a preferred embodiment, each shaper amplifier is an Ortec 450 Research amplifier. Other filters may also be used such as a simple low pass or band-pass operational amplifier filter. In the alternative, the use of one or more shaper amplifiers is forgone, leaving excess noise in the system, or by implementing the digital equivalent, preferably by a microcontroller or ASIC (Application Specific Integrated Circuit).

Each peak detector (first peak detector 37, and second peak detector 43) is capable of producing the maximum voltage received during a given time interval. Each peak detector is preferably based on an operational amplifier. In the alternative, the use of one or more peak detectors is foregone by implementing the digital equivalent, preferably by a microcontroller or ASIC.

Each analog-to-digital (A/D) converter (first analog-to-digital converter 39, and second analog-to-digital converter 45) is capable of converting the respective analog signal into a digital form equivalent, for example, a 12 bit A/D converter.

The computer 47 is capable of calculating the energy and depth of ionizing events from ionizing radiation and is preferably a computer, ASIC (Application Specific Integrated Circuit), or more preferably a microcontroller.

The output of the difference amplifier 15, the difference between the collecting grid 7 and the non-collecting grid 9, is directly related to the energy of the ionizing event. The ratio of the output of the sum amplifier 33 and the output of the difference amplifier 15 is directly related to the depth of ionizing event of the ionizing event. Therefore, the computer 47 can determine a gain coefficient for each ratio once calibrated using known ionizing events. Once a gain coefficient is determined for a ratio, the computer 47 can calculate the energy of ionizing events accounting for electron trapping by multiplying the output of the difference amplifier 15 by the corresponding gain coefficient for the ratio of the ionizing event.

Figure 5A:
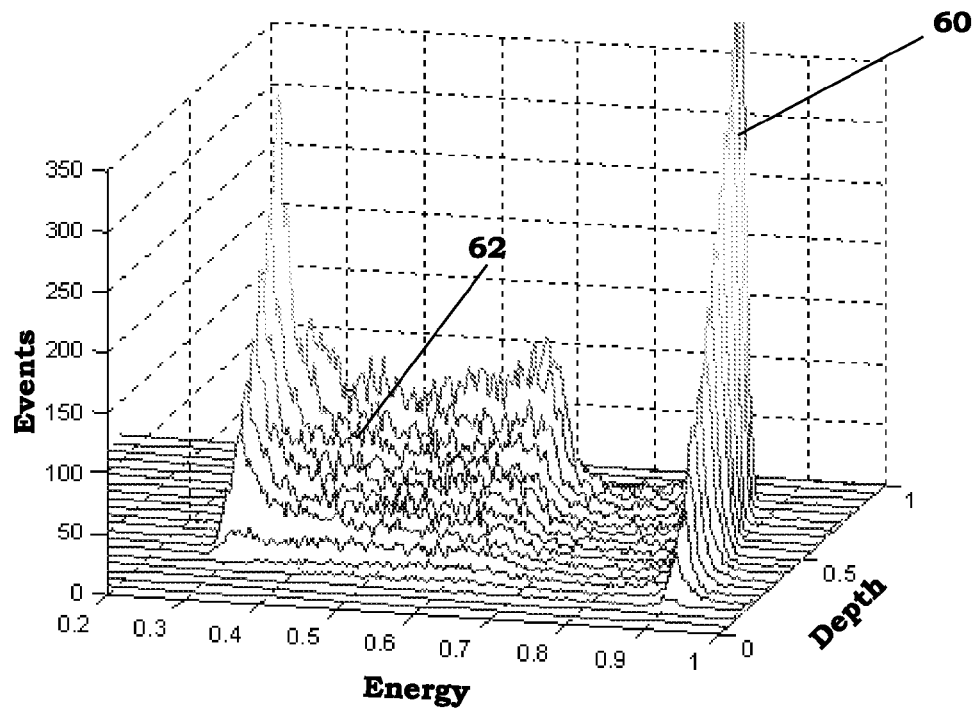
FIG. 5a depicts three-dimensional plot from a Cs-137 source detected by the preferred embodiment.

FIG. 5a shows measurements detected using a Cs-137 source (generating gamma rays at 662 keV) with the preferred embodiment 31, shown in FIG. 4. The x axis of FIG. 5a is a normalization of the difference amplifier 15 output, related to the energy of the ionizing event. The y-axis of FIG. 5a, is the count of ionizing events detected by a sharp peak. The z-axis of FIG. 5a, is the ratio of the sum amplifier 33 output over the difference amplifier output 15, related to the depth of the ionizing event. The depth of ionizing event was calculated using the non-linear method described above.

Figure 5B:
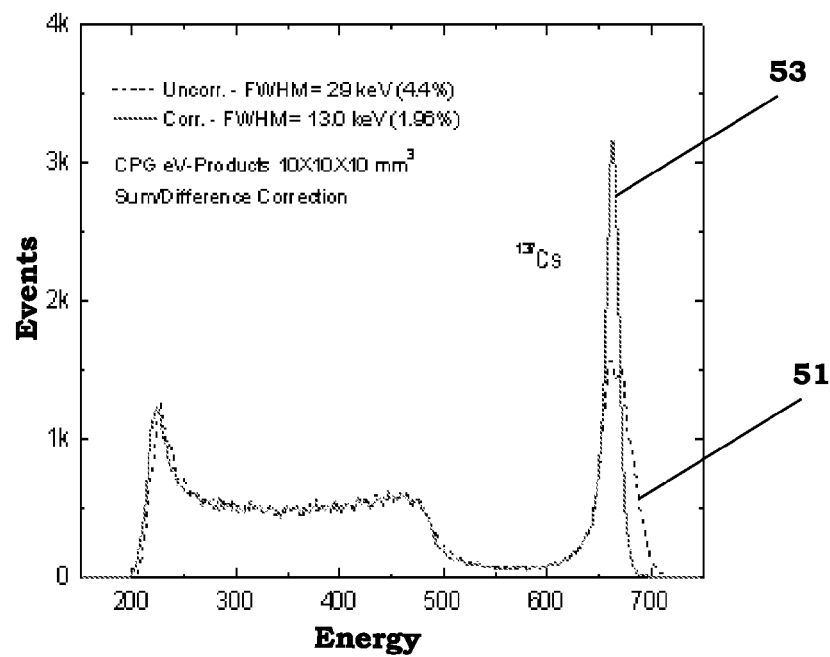
FIG. 5b depicts a plot showing uncorrected and corrected energy values from a Cs-137 source detected by the preferred embodiment.

Ionizing events, shown in FIG. 5a, from the 662 keV Cs-137 source 60 can be easily determined by the large uniform peak of events centered between the normalized energy (x-axis) of 0.8 and 1. Compton Scattering Events 62 can also be significant signal, but when aggregated (as shown in FIG. 5b), become less prominent. Compton Scattering Events 62 can also be easily identified by its relatively broad energy gap at the lower energy levels. As shown, events having a low depth (occurring closer to the collecting grid 7) have energy lower than their high depth (occurring closer to the cathode electrode 5) counterparts. A gain coefficient for each depth is determined using the ionizing events from the 662 keV Cs-137 source 60, whereby the energy when multiplied by the gain coefficient for the depth of the ionizing event is 662 keV (energy of ionizing radiation from the Cs-137 source).

The depth corrected energy 53 and the uncorrected energy 51 for the preferred embodiment 31 after calibration is shown in FIG. 5b. As shown, the depth corrected energy 53 has a much sharper response, whereby the energy of the events are more closely centered around 662 keV. In the preferred embodiment 31, the depth corrected energy had an increased resolution from 29 keV (uncorrected) to 13 keV (corrected).

In the alternative, a selected difference measurement may be assumed to be the actual peak energy reading. Preferably, a frequently occurring event ionizing close to the collecting grid is selected. Each gain coefficient is adjusted so as to align with the energy of the selected difference measurement. Using this alternative method, gain coefficients may be temporarily adjusted for each reading, or periodically permanently adjusted. In one embodiment, the sensor is initially calibrated using this alternative method, resulting in a relative energy value output rather than an absolute energy value, such as a keV. In another embodiment, the sensor is initially calibrated using a known source, and periodically recalibrated using this alternative method.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A method of measuring the depth corrected energy of an ionizing event from a co-planar grids sensor comprising a cathode electrode, a collecting grid and a non-collecting grid comprising the steps of:
    producing a collecting grid voltage and applying said collecting grid voltage to said collecting grid;
    said collecting grid voltage greater than about 0 Volts;
    producing a non-collecting grid voltage and applying said non-collecting grid voltage to said non-collecting grid;
    said non-collecting grid voltage less than said collecting grid voltage;
    producing a cathode voltage and applying said cathode voltage to said cathode electrode;
    detecting a voltage change of said collecting grid; detecting a voltage change of said non-collecting grid;
    summing said voltage change of said collecting grid and said voltage change of said non-collecting grid creating a sum;
    subtracting said voltage change of said collecting grid and said voltage change of said non-collecting grid creating a difference;
    dividing said sum by said difference creating a ratio;
    employing a step for determining a gain coefficient value from said ratio; and
    multiplying said difference by said gain coefficient;
    whereby said step of summing, said step of subtracting, said step of dividing, and said step of multiplying are all performed by one or more processing devices.

2. The method of measuring a depth corrected ionizing event of claim 1 whereby said step of summing, said step of subtracting, said step of dividing, and said step of multiplying are all performed by the one or more processing devices employing a computer, a microcontroller, or an ASIC.

3. The method of measuring a depth corrected ionizing event of claim 1 whereby said step of summing and said step of subtracting are each performed by the one or more processing devices employing an operational amplifier.

4. The method of measuring a depth corrected ionizing event of claim 1 whereby said step of dividing and said step of multiplying are each performed by the one or more processing devices employing an operational amplifier.

5. The method of measuring a depth corrected ionizing event of claim 1 whereby said step for determining a gain coefficient comprises the steps of:
    exposing said co-planar grids to a known ionizing radiation; and
    employing a step for constructing a table of gain coefficient values.

6. The method of measuring a depth corrected ionizing event of claim 1 whereby said step for determining a gain coefficient comprises the steps of:
    exposing said co-planar grids to a known ionizing radiation; and
    step for constructing an equation for determining a gain coefficient from said ratio.

7. The method of measuring a depth corrected ionizing event of claim 1 whereby said co-planar grids sensor further comprises a substrate made from a material selected from the group of material consisting of $HgI_2$, CdTe and CdZnTe.

8. The method of measuring a depth corrected ionizing event of claim 1 whereby said cathode voltage is less than about negative 1,000 Volts.

9. The method of measuring a depth corrected ionizing event of claim 1 whereby said collecting grid voltage is about 60 Volts greater than said non-collecting grid voltage.

10. The method of measuring a depth corrected ionizing event of claim 1 whereby:
    a) said cathode voltage is between about negative 1,500 and negative 7,000 Volts;
    b) said collecting grid voltage is about 0 Volts; and
    c) said non-collecting grid voltage is about negative 60 Volts.

11. The method of measuring a depth corrected ionizing event of claim 1 whereby said summing step employs an operational amplifier.

12. The method of measuring a depth corrected ionizing event of claim 1 whereby said summing step employs a shaper amplifier and a peak detector.

13. The method of measuring a depth corrected ionizing event of claim 1 whereby said subtracting step employs an operational amplifier.

14. The method of measuring a depth corrected ionizing event of claim 1 whereby said subtracting step employs a shaper amplifier and a peak detector.

15. The method of measuring a depth corrected ionizing event of claim 1 whereby said summing step, said subtracting step, and said step for determining a gain coefficient value employ a computer or a microcontroller.

16. A method of measuring a depth of an ionizing event from a co-planar grids sensor comprising a cathode electrode, a collecting grid and a non-collecting grid comprising the steps of:
    producing a collecting grid voltage and applying said collecting grid voltage to said collecting grid;
    said collecting grid voltage greater than about 0 Volts;
    producing a non-collecting grid voltage and applying said non-collecting grid voltage to said non-collecting grid;
    said non-collecting grid voltage less than said collecting grid voltage;
    producing a cathode voltage and applying said cathode voltage to said cathode electrode;
    detecting a voltage change of said collecting grid;
    detecting a voltage change of said non-collecting grid;
    summing said voltage change of said collecting grid and said voltage change of said non-collecting grid creating a sum;
    subtracting said voltage change of said collecting grid and said voltage change of said non-collecting grid creating a difference; and
    employing a step for calculating the depth of said ionizing event from the division of said sum by said difference;

whereby said step of summing, said step of subtracting, and said step of dividing are performed by one or more processing devices.

17. The method of measuring a depth of an ionizing event of claim 16 whereby said step for calculating the depth of said ionizing event comprises the steps of:
  exposing said co-planar grids sensor to a known ionizing radiation; and
  step for constructing a table of ionization depths for various values of said division of said sum and said difference.

18. The method of measuring a depth of an ionizing event of claim 16 whereby said step for calculating the depth of said ionizing event comprises the steps of:
  exposing said co-planar grids sensor to a known ionizing radiation; and
  step for constructing an equation for determining said depth from said sum and said difference.

19. The method of measuring a depth corrected ionizing event of claim 16 whereby said collecting grid voltage is about 60 Volts greater than said non-collecting grid voltage.

20. The method of measuring a depth corrected ionizing event of claim 16 whereby:
  a) said cathode voltage is between about negative 1,500 and negative 7,000 Volts;
  b) said collecting grid voltage is about 0 Volts; and
  c) said non-collecting grid voltage is about negative 60 Volts.

* * * * *